(12) United States Patent
Allen et al.

(10) Patent No.: US 12,553,344 B2
(45) Date of Patent: Feb. 17, 2026

(54) HYDRAULIC PISTON PUMP/MOTOR WITH NON-CANTILEVERED PISTONS

(71) Applicant: GOODRICH CORPORATION, Charlotte, NC (US)

(72) Inventors: Jason Bradley Allen, Waco, TX (US); Damian Marcin Studzinski, Wrocław (PL)

(73) Assignee: GOODRICH CORPORATION, Charlotte, NC (US)

( * ) Notice: Subject to any disclaimer, the term of this patent is extended or adjusted under 35 U.S.C. 154(b) by 178 days.

(21) Appl. No.: 18/608,120

(22) Filed: Mar. 18, 2024

(65) Prior Publication Data
US 2025/0290418 A1  Sep. 18, 2025

(51) Int. Cl.
*F01B 3/00* (2006.01)

(52) U.S. Cl.
CPC .......... *F01B 3/0088* (2013.01); *F01B 3/0035* (2013.01); *F01B 3/007* (2013.01)

(58) Field of Classification Search
CPC ...... F01B 3/0088; F01B 3/0035; F01B 3/007; F04B 27/0882; F04B 27/0808; F04B 27/086; F04B 1/22; F04B 1/2078
See application file for complete search history.

(56) References Cited

U.S. PATENT DOCUMENTS

| | | | | |
|---|---|---|---|---|
| 1,019,521 | A * | 3/1912 | Pratt | F04B 1/22 |
| | | | | 417/46 |
| 1,781,068 | A * | 11/1930 | Michell | F01B 3/0088 |
| | | | | 91/503 |
| 4,478,557 | A * | 10/1984 | Schott | F15B 3/00 |
| | | | | 91/499 |
| 4,787,828 | A * | 11/1988 | Schweitzer | F15B 3/00 |
| | | | | 91/482 |
| 6,283,009 | B1 | 9/2001 | Hayashi et al. | |
| 6,595,886 | B1 | 7/2003 | Forster | |
| 6,663,354 | B2 | 12/2003 | Forster | |
| 9,506,456 | B2 * | 11/2016 | Sitzler | F04B 1/126 |
| 9,624,914 | B2 | 4/2017 | Maruoka et al. | |
| 10,247,178 | B2 | 4/2019 | Sink et al. | |

* cited by examiner

*Primary Examiner* — Bryan M Lettman
(74) *Attorney, Agent, or Firm* — SNELL & WILMER L.L.P.

(57) ABSTRACT

A hydraulic piston motor/pump includes a first rotor including a first cylinder, a second rotor opposing the first rotor and including a second cylinder that opposes the first cylinder, a first swashplate including a first angled face adjacent the first rotor, a second swashplate adjacent the second rotor and opposing the first swashplate. The hydraulic piston motor/pump further includes a first shoe cage including a first piston opening, a second shoe cage including a second piston opening, a piston configured to travel into and out of the first cylinder and the second cylinder, a piston shoe configured to engage the piston, the first shoe cage, and the second shoe cage, and a shaft engaging the first shoe cage and the second shoe cage. The shaft configured to rotate in response to a rotation of the first shoe cage and the second shoe cage.

20 Claims, 4 Drawing Sheets

HYDRAULIC PISTON PUMP/MOTOR WITH NON-CANTILEVERED PISTONS

FIELD

The present disclosure generally relates hydraulic piston pumps and motors, and more particularly, to the piston configuration of hydraulic piston pumps and motors.

BACKGROUND

Hydraulic pistons are used in a variety of applications including in pumps and motors. For example, hydraulic piston motors are used in the nose landing gear of some aircraft to turn the nose landing gear while taxiing. Some hydraulic piston pumps and motors include a cylinder block that houses multiple hydraulic pistons and each hydraulic piston that interfaces with and moves along a swashplate. In some hydraulic piston motors the hydraulic pistons are extended and retracted so that the piston heads interface with the swashplate to rotate the cylinder barrel and generate a torque on an output shaft. In some hydraulic piston pumps, torque is applied to an input shaft that rotates the cylinder barrel causing the hydraulic pistons to move along the swashplate to extend or retract. Some hydraulic piston motors and pumps further include a shoe that provides an interface between the hydraulic piston and the swashplate to reduce friction and wear on the hydraulic piston.

SUMMARY

A hydraulic piston motor is disclosed herein. The hydraulic piston motor includes a first rotor including a first cylinder, a second rotor opposing the first rotor, the second rotor including a second cylinder opposing the first cylinder, a first swashplate adjacent the first rotor, the first swashplate including a first angled face, a second swashplate adjacent the second rotor and opposing the first swashplate, a first shoe cage including a first piston opening, the first shoe cage disposed adjacent the first angled face of the first swashplate, a second shoe cage including a second piston opening, the second shoe cage adjacent the first shoe cage, a piston including configured to travel into and out the first cylinder and the second cylinder and to pass through the first piston opening and the second piston opening, a piston shoe configured to engage the piston, the first shoe cage, and the second shoe cage, and a shaft engaging the first shoe cage and the second shoe cage and configured to rotate in response to a rotation of the first shoe cage and the second shoe cage.

In various embodiments, the second swashplate includes a second angled face that is parallel to the first angled face of the first swashplate. In various embodiments, the second shoe cage is disposed adjacent to and engages the second angled face of the second swashplate. In various embodiments, the shaft includes a first cylindrical end, a second cylindrical end, and a spherical center between the first cylindrical end and the second cylindrical end, wherein the first shoe cage and the second shoe cage are configured to engage the spherical center. In various embodiments, the piston includes a first cylindrical end, a second cylindrical end, and a spherical center between the first cylindrical end and the second cylindrical end, wherein the first shoe cage and the second shoe cage engage the spherical center of the piston via the piston shoe.

In various embodiments, the piston shoe includes a first piston shoe and a second piston shoe. In various embodiments, the hydraulic piston motor further includes a plurality of bolts to couple the first shoe cage to the second shoe cage. In various embodiments, the first rotor includes a first center opening, the second rotor includes a second center opening, the first shoe cage includes a first shaft opening, and the second shoe cage includes a second shaft opening, wherein the shaft passes through the first center opening, the first shaft opening, the second shaft opening, and the second center opening. In various embodiments, the hydraulic piston motor further includes a first wear plate disposed on the first angled face and between the first angled face and the first shoe cage. In various embodiments, the first swashplate includes a first material having a first weight and the first wear plate includes a second material having a second weight that is greater than the first weight.

Also disclosed herein is an aircraft including a nose landing gear assembly including a hydraulic piston motor. The hydraulic piston motor includes a first rotor including a first cylinder, a second rotor opposing the first rotor, the second rotor including a second cylinder opposing the first cylinder, a first swashplate adjacent the first rotor, the first swashplate including a first angled face, a second swashplate adjacent the second rotor and opposing the first swashplate, a first shoe cage including a first piston opening, the first shoe cage disposed adjacent the first angled face of the first swashplate, a second shoe cage including a second piston opening, the second shoe cage adjacent the first shoe cage, a piston including configured to travel into and out of the first cylinder and the second cylinder and to pass through the first piston opening and the second piston opening, a piston shoe configured to engage the piston, the first shoe cage, and the second shoe cage, and a shaft engaging the first shoe cage and the second shoe cage and configured to rotate in response to a rotation of the first shoe cage and the second shoe cage.

In various embodiments, the second swashplate includes a second angled face that is parallel to the first angled face of the first swashplate. In various embodiments, the second shoe cage is disposed adjacent to and engages the second angled face of the second swashplate. In various embodiments, the shaft includes a first cylindrical end, a second cylindrical end, and a spherical center between the first cylindrical end and the second cylindrical end, wherein the first shoe cage and the second shoe cage are configured to engage the spherical center. In various embodiments, the piston includes a first cylindrical end, a second cylindrical end, and a spherical center between the first cylindrical end and the second cylindrical end, wherein the first shoe cage and the second shoe cage engage the piston via the spherical center.

In various embodiments, the piston shoe includes a first piston shoe and a second piston shoe, the first piston shoe configured to engage the second shoe cage via the second piston shoe, and the second piston shoe configured to engage the first shoe cage via the first piston shoe. In various embodiments, the hydraulic piston motor further includes a plurality of bolts to couple the first shoe cage to the second shoe cage. In various embodiments, the first rotor includes a first center opening, the second rotor includes a second center opening, the first shoe cage includes a first shaft opening, and the second shoe cage includes a second shaft opening, wherein the shaft passes through the first center opening, the first shaft opening, the second shaft opening, and the second center opening. In various embodiments, the hydraulic piston motor further includes a first wear plate disposed on the first angled face and between the first angled face and the first shoe cage. In various embodiments, the first swashplate includes a first material having a first weight and the first wear plate includes a second material having a second weight that is greater than the first weight.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
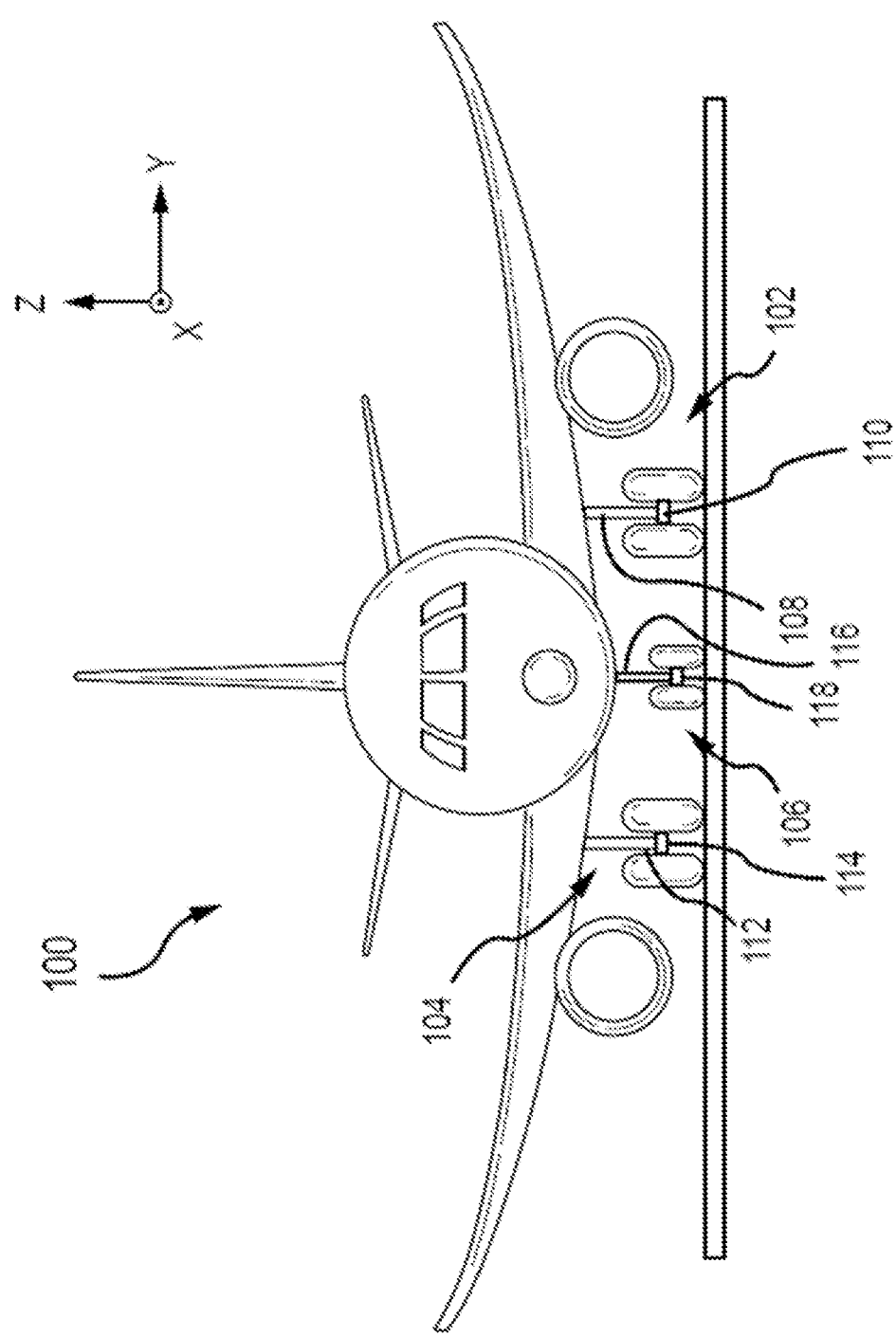
FIG. 1 illustrates an aircraft having a landing gear assembly and wheels mounted thereon, according with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Generally, hydraulic axial piston pumps and motors include pistons that are cantilevered from a cylinder block as they interface with a swashplate. That is, each piston travels into and out from the cylinder block. During normal operation, the further the piston extends out from the cylinder block the greater the piston bending moment arm is, and therefore, increased piston bending loads and stresses. The increased bending loads and stresses tend to increase wear of the pistons and the cylinder block.

Disclosed herein is a hydraulic pump/motor that has an opposed cylinder configuration with non-cantilevered pistons spanning both cylinder blocks. In various embodiments, the hydraulic pump/motor includes a first rotor including a first plurality of cylinders and an opposing second rotor including a second plurality of cylinders. In various embodiments, the hydraulic pump/motor includes a plurality of pistons that each extend from a cylinder of the first plurality of cylinders to a corresponding cylinder of the second plurality of cylinders. In various embodiments, each of the plurality of pistons includes a cylindrical first end, a cylindrical second end, and a spherical center between the cylindrical first end and the cylindrical second end. In various embodiments, the hydraulic pump/motor includes a shaft having a cylindrical first end, a cylindrical second end, and a spherical center between the cylindrical first end and the cylindrical second end. In various embodiments, the hydraulic pump/motor includes a first swashplate adjacent the first rotor and a second swashplate adjacent the second rotor. In various embodiments, the first swashplate has a first angled face and the second swashplate has a second angled face that is parallel to the first angled face. In various embodiments, the hydraulic pump/motor includes a first wear plate disposed on the first angled face and a second wear plate disposed on the second angled face.

In various embodiments, the hydraulic pump/motor includes a first shoe cage configured to engage the first swashplate and a second shoe cage configured to engage the second swashplate. In various embodiments, the first shoe cage is secured to the second shoe cage by a plurality of bolts. In various embodiments, the hydraulic pump/motor includes a first plurality of piston shoes configured to engage the first shoe cage and a second plurality of piston shoes configured to engage the second shoe cage. In various embodiments, a pair of piston shoes including a first piston shoe from the first plurality of piston shoes and a second piston shoes from the plurality of second piston shoes engage the spherical center of a piston. In various embodiments, the first shoe engages the first shoe cage in response to the piston moving in a first direction and the second shoe engages the second shoe cage in response to the piston moving in a second direction opposite the first direction. In various embodiments, the first shoe cage and the second shoe cage engage the spherical center of the shaft in response to the first piston shoe and/or the second piston shoe. In various embodiments, the hydraulic piston motor/pump includes a plurality of seals in the cylinders to limit and/or prevent leakage.

In various embodiments, each piston, therefore, is a simply supported beam as opposed to a cantilevered beam of traditional piston pump/motor designs. The design disclosed herein tends to reduce the bending stress of each piston. Simply supported beams have a bending stress that is about one-fourth that of a cantilevered beam for a given span. In various embodiments, a higher operating pressure may be achieved due to the lower bending stresses on each piston having a constant piston diameter and material. Additionally, and in various embodiments, opposed cylinder blocks tend to have a shorter axial length as compared to a single cylinder block because the opposed cylinder blocks do not have to react to cantilevered piston moments. As a result, the engaged length of each piston within the cylinder block bores is shorter than a traditional single cylinder block design. In various embodiments, the hydraulic pump/motor described herein may be a drop in replacement for existing hydraulic pump/motors.

Referring to FIG. 1, an aircraft 100 is illustrated, in accordance with various embodiments. Aircraft 100 may include one or more landing gear, such as, for example, a left landing gear 102 (or port-side landing gear), a right landing gear 104 (or starboard-side landing gear) and a nose landing gear 106. Each of left landing gear 102, right landing gear 104 and nose landing gear 106 may support aircraft 100 when not flying, allowing aircraft 100 to taxi, takeoff, and land, safely and without damage to the aircraft. Left landing gear 102 may include a left landing gear assembly 108 that includes a left wheel assembly 110, right landing gear 104 may include a right landing gear assembly 112 that includes a right wheel assembly 114 and nose landing gear 106 may include a nose landing gear assembly 116 that includes a nose wheel assembly 118. Nose landing gear assembly 116 may further include a hydraulic piston motor that is configured to turn, or rotate, nose wheel assembly 118. That is, the hydraulic piston motor turns nose wheel assembly 118 during taxiing operations to steer aircraft 100 on the ground.

Figure 2A:
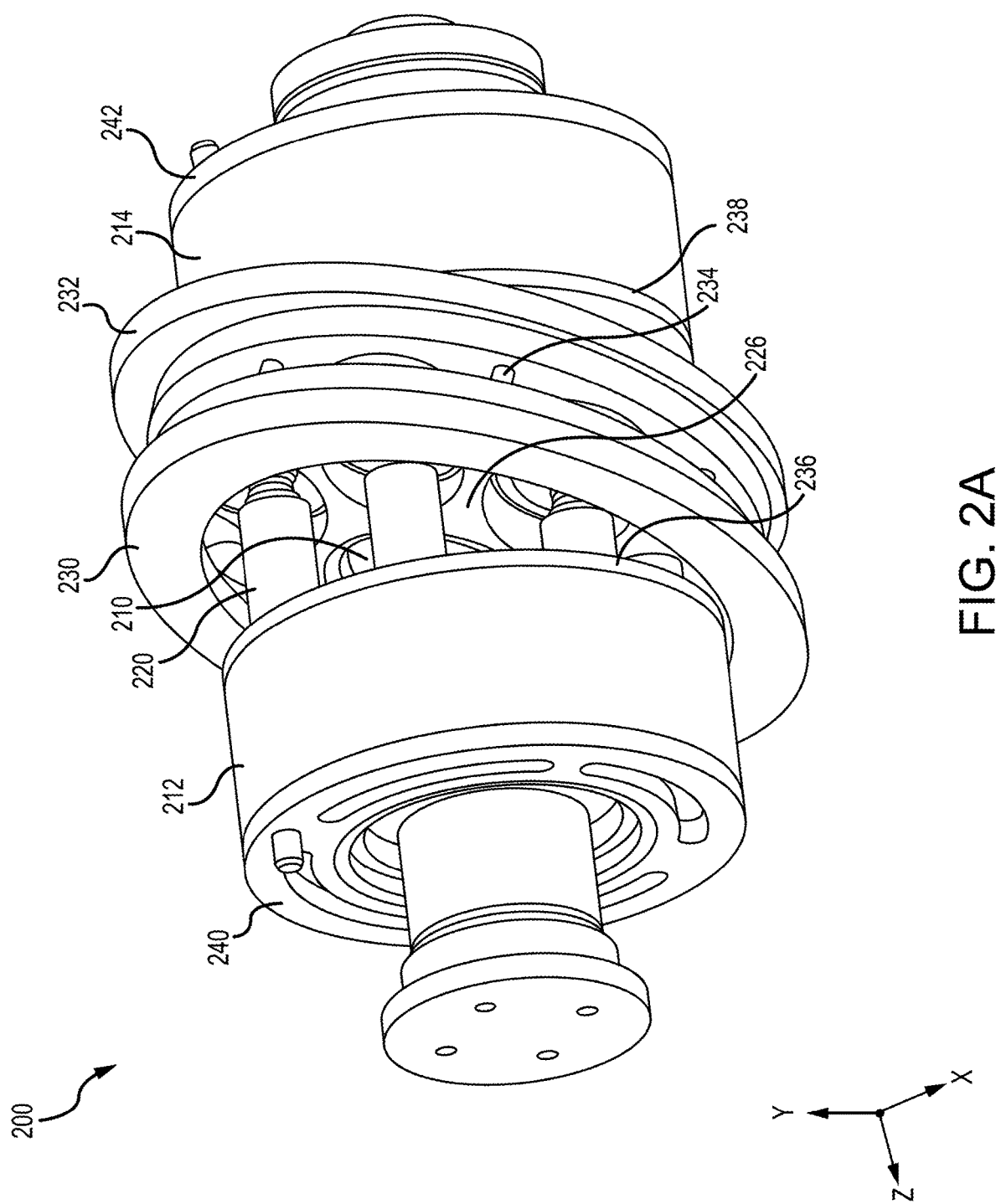
FIG. 2A illustrates a perspective view of a hydraulic piston motor/pump, in accordance with various embodiments.
Figure 2B:
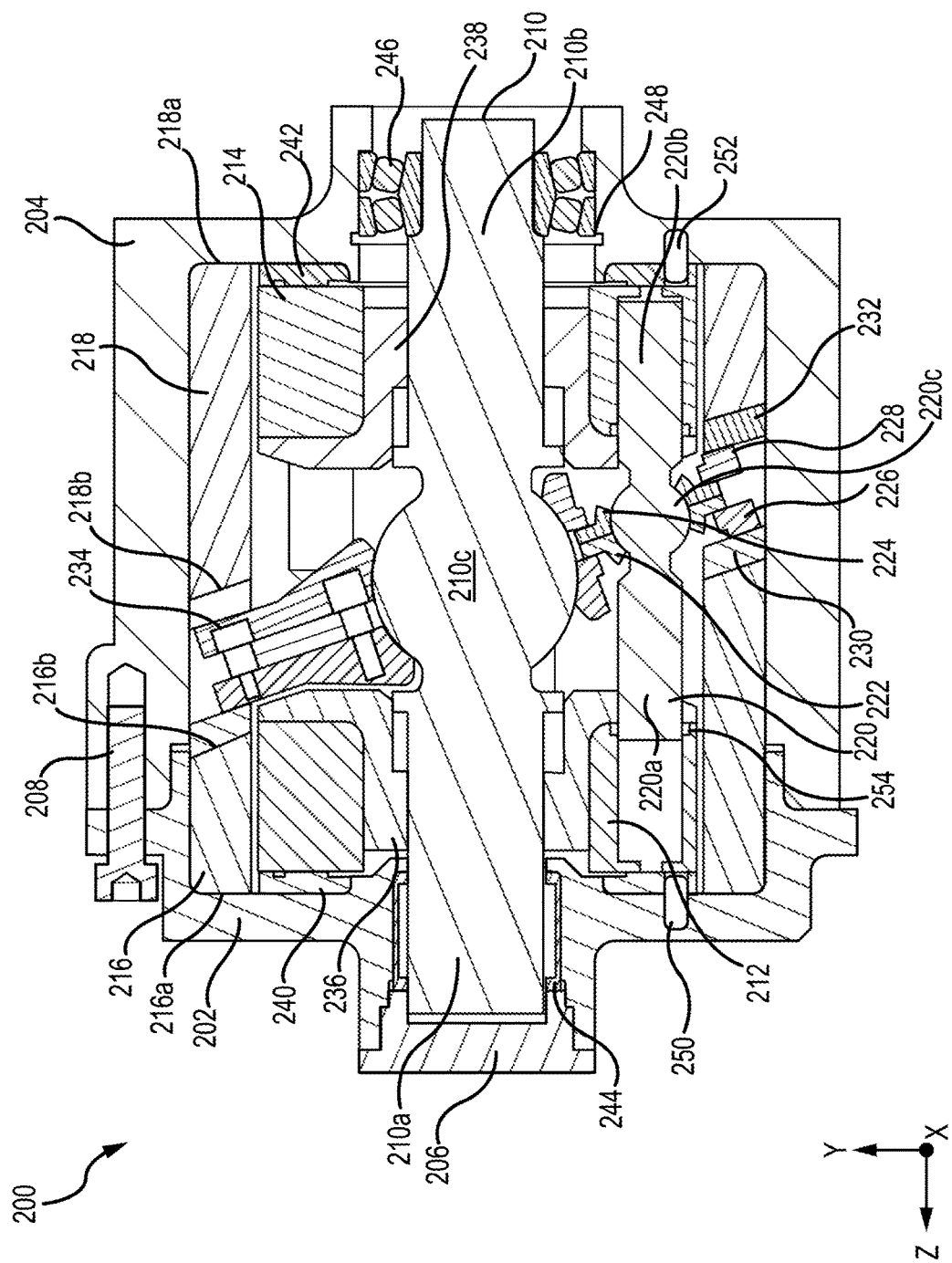
FIG. 2B illustrates a cross section view of a hydraulic piston motor/pump, in accordance with various embodiments.
Figure 2C:
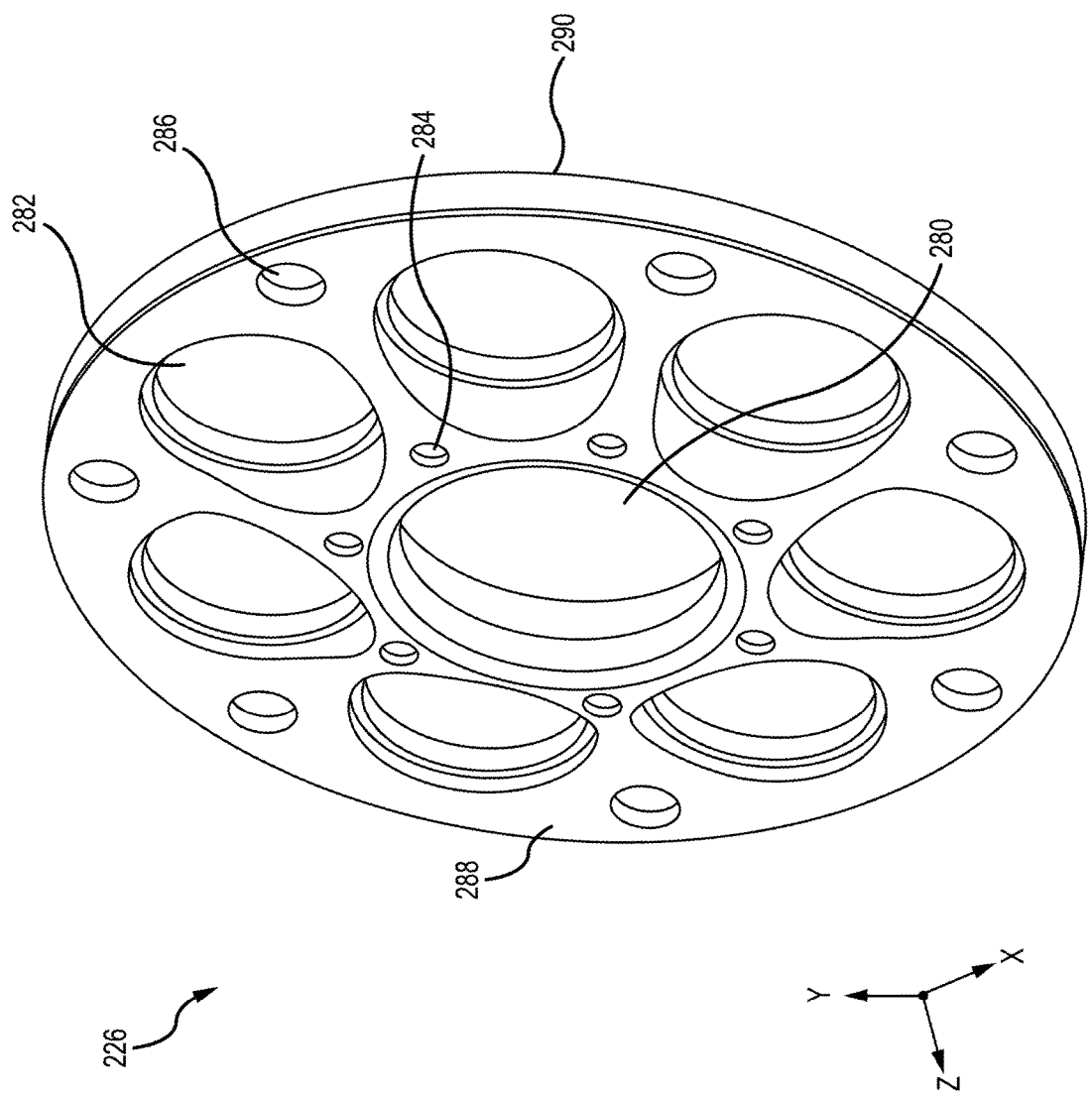
FIG. 2C illustrates a shoe cage used in a hydraulic piston motor/pump, in accordance with various embodiments.

Referring now to FIGS. 2A-2C, a hydraulic piston motor 200 is illustrated, in accordance with various embodiments. In various embodiments, hydraulic piston motor 200 may alternatively be used as a hydraulic piston pump. In various embodiments, hydraulic piston motor 200 may be used on aircraft 100, and more specifically, on nose wheel assembly 118. Hydraulic piston motor 200 includes a first housing 202, a second housing 204, a cover 206, and a plurality of bolts 208. First housing 202 and second housing 204 form a housing of hydraulic piston motor 200 with first housing 202 being a first side the housing (e.g., in the positive z-direction) and second housing 204 being a second side of the housing (e.g., in the negative z-direction). That is, first housing 202 and second housing 204 are configured to interconnect and house the components of hydraulic piston motor 200. The plurality of bolts 208 secure first housing 202 to second housing 204. Cover 206 is configured to secure the first end (e.g., in the positive z-direction) of first housing 202.

Hydraulic piston motor 200 further includes a shaft 210, a first rotor 212, a second rotor 214, a first swashplate 216, a second swashplate 218, a plurality of pistons 220, a first piston shoe 222, a second piston shoe 224, a first shoe cage 226, a second shoe cage 228, a first wear plate 230, and a second wear plate 232. Shaft 210 extends a length of hydraulic piston motor 200 (e.g., along the z-axis) along a center axis and between first housing 202 and second housing 204. Shaft 210 has a first cylindrical end 210a (e.g., in the positive z-direction), a second cylindrical end 210b (e.g., in the negative z-direction), and a spherical center 210c between first cylindrical end 210a and second cylindrical end 210b. First cylindrical end 210a extends through first rotor 212 and second cylindrical end 210b extends through second rotor 214.

First rotor 212 is cylindrical in shape having a first center opening through which shaft 210 extends and a first plurality of cylinders configured to receive the plurality of pistons 220. Each piston 220 of the plurality of pistons 220 is configured to travel into (e.g., in the positive z-direction) and out of (e.g., in the negative z-direction) a cylinder of the first plurality of cylinders. Each piston 220 travels along an axis parallel to the center axis.

Second rotor 214 is cylindrical in shape having a second center opening through which shaft 210 extends and a second plurality of cylinders configured to receive the plurality of pistons 220. Each piston 220 of the plurality of pistons 220 is configured to travel into (e.g., in the negative z-direction) and out of (e.g., in the positive z-direction) a cylinder of the second plurality of cylinders. Each piston 220 traveling along the axis parallel to the center axis. In other words, a first piston 220 travels in a first direction (e.g., in the positive z-direction) so that a first end of first piston 220 travels into a first cylinder of the first plurality of cylinders and a second side of first piston 220 travels out of a second cylinder of the second plurality of cylinders. First piston then travels in a second direction opposite the first direction (e.g., in the negative z-direction) so that the first end of first piston 220 travels out of first cylinder and the second end of first piston 220 travels into the second cylinder.

First swashplate 216 is annular in shape such that first rotor 212 is located through a center of first swashplate 216. First swashplate 216 has a first face 216a (e.g., in the positive z-direction) adjacent first housing 202 and a second face 216b (e.g., in the negative z-direction) facing second housing 204. Second face 216b is angled with respect to first face 216a. First wear plate 230 is annular in shape and configured to cover second face 216b of first swashplate 216. First wear plate 230 may, in various embodiments, include a harder material than first swashplate 216. That is, first swashplate 216 may be formed of a first material and First wear plate 230 may be formed of a second material is harder, denser, and/or heavier than the first material. This allows first swashplate 216 to be lighter than would otherwise be possible due to the wear protection provided by First wear plate 230.

Second swashplate 218 is annular in shape such that second rotor 214 is located through a center of second swashplate 218. Second swashplate 218 has a first face 218a (e.g., in the negative z-direction) adjacent second housing 204 and a second face 218b (e.g., in the positive z-direction) facing first housing 202. Second face 218b is angled with respect to first face 218a and parallel to second face 216b of first swashplate 216. Second wear plate 232 is annular in shape and configured to cover second face 218b of second swashplate 218. Second wear plate 232 may, in various embodiments, include a harder material than second swashplate 218. That is, second swashplate 218 may be formed of the first material and second wear plate 232 may be formed of the second material that is harder and/or denser than the first material. This allows second swashplate 218 to be lighter than would otherwise be possible due to the wear protection provided by second wear plate 232.

The plurality of pistons 220 are disposed between first rotor 212 and second rotor 214 and circumferentially around shaft 210. Each piston 220 of the plurality of pistons 220 travels into and out of first rotor 212 and second rotor 214. That is, each piston 220 is configured to travel into first rotor 212 and out second rotor 214 and to travel out first rotor 212 and into second rotor 214. Accordingly, each piston 220 is a simply supported beam extending between first rotor 212 and second rotor 214. In contrast, each piston in typical hydraulic piston motors and pumps is a cantilevered beam with additional lateral stresses and movements that are not present in simply supported beams. Each piston 220 being a simply supported beam tends to reduce the amount of movement, and stress, in hydraulic piston motor 200.

Each piston 220 of the plurality of pistons includes a first end 220a, a second end 220b, and a spherical center 220c between first end 220a and second end 220b. As described above, first end 220a travels into and out a corresponding cylinder in first rotor 212 (e.g., along the z-axis) and second end 220b travels into and out a corresponding cylinder in second rotor 214 (e.g., along the z-axis).

First piston shoe 222 and second piston shoe 224 are configured to work as a pair to engage spherical center 220c of piston 220. That is, first piston shoe 222 exerts a force on piston 220 in response to piston 220 moving in a first direction (e.g., in the positive z-direction). Conversely, second piston shoe 224 exerts a force on piston 220 in response to piston 220 moving in a second direction opposite the first direction (e.g., in the negative z-direction). In various embodiments, first piston shoe 222 and second piston shoe 224 each include a lower portion and an upper portion. In various embodiments, the lower portion is concave and configured to engage spherical center 220c of piston 220. In various embodiments, the upper portion is perpendicular to the lower portion and configured to engage first shoe cage 226.

First shoe cage 226 includes a center opening 280, a plurality of piston openings 282, a first plurality of bolt openings 284, and a second plurality of bolt openings 286. Center opening 280 is configured to engage spherical center 210c of shaft 210 and each of the plurality of piston openings is configured to receive a piston 220, first piston shoe 222, and second piston shoe 224. First shoe cage 226 has a first face 288 (e.g., in the positive z-direction) and a second face 290 (e.g., in the negative z-direction).

Second shoe cage 228 is similar to first shoe cage 226 but oriented opposite first shoe cage 226. That is, second face 290 of second shoe cage 228 is adjacent to second face 290 of first shoe cage 226. Second shoe cage 228 is secured to first shoe cage 226 by a plurality of shoulder screws 234. One screw of the plurality of screws 234 passes through a bolt opening of the first plurality of bolt openings 284 in the first shoe cage 226 and the second shoe cage 228 or a bolt opening of the second plurality of bolt openings 286 in the first shoe cage 226 and the second shoe cage 228. This allows the first shoe cage 226 and the second shoe cage 228 to operate as a single unit to rotate shaft 210. The use of shoulder screws 234 prevents the screws from clamping the upper portion of the piston shoes 222, 224. In other words, shoulder screws 234 create a tight clearance between the adjacent faces 290 of the shoe cages 226 and the upper portion of the piston shoes 222, 224.

Hydraulic piston motor 200 further includes a first bearing plate 236, a second bearing plate 238, a first valve plate 240, a second valve plate 242, needle bearing 244, double row cylindrical roller bearings 246, a retaining groove 248, a first positioning pin 250, a second positioning pin 252, and a plurality of piston seals 254. First bearing plate 236 is between shaft 210 and first rotor 212 and second bearing plate 238 is between shaft 210 and second rotor 214. First bearing plate 236 and second bearing plate 238 allow shaft 210 to rotate with respect to first rotor 212 and second rotor 214, respectively.

First valve plate 240 and second valve plate 242 are configured to allow hydraulic fluid to enter and exit the cylinders of first rotor 212 and second rotor 214, respectively. That is, first valve plate 240 includes openings that align with the cylinders of first rotor 212 and second valve plate 242 includes openings that align with the cylinders of second rotor 214. Hydraulic fluid may then enter and exit the cylinders to move the plurality of pistons 220. First positioning pin 250 prevents first valve plate 240 from rotating with respect to first housing 202. Second positioning pin 252 prevents second valve plate 242 from rotating with respect to second housing 204.

Needle bearing 244 and double row cylindrical roller bearings 246 allow shaft 210 to rotate with respect to first housing 202 and second housing 204, respectively. Retaining groove 248 is configured to receive a ring that secures double row cylindrical roller bearings 246 in place with respect to second housing 204. The plurality of piston seals 254 are located within the cylinders of first rotor 212 and second rotor 214. Each piston seal 254 of the plurality of piston seals 254 engages a piston 220 of the plurality of pistons 220 to reduce and/or prevent leakage of fluid as the plurality of pistons 220 move.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A hydraulic piston motor, comprising:
   a first rotor including a first cylinder;
   a second rotor opposing the first rotor, the second rotor including a second cylinder opposing the first cylinder;
   a first swashplate adjacent the first rotor, the first swashplate including a first angled face;
   a second swashplate adjacent the second rotor and opposing the first swashplate;
   a first shoe cage including a first piston opening, the first shoe cage disposed adjacent the first angled face of the first swashplate;
   a second shoe cage including a second piston opening, the second shoe cage adjacent the first shoe cage;
   a piston configured to travel into and out the first cylinder and the second cylinder and to pass through the first piston opening and the second piston opening;
   a piston shoe configured to engage the piston, the first shoe cage, and the second shoe cage; and
   a shaft engaging the first shoe cage and the second shoe cage and configured to rotate in response to a rotation of the first shoe cage and the second shoe cage.

2. The hydraulic piston motor of claim 1, wherein the second swashplate includes a second angled face that is parallel to the first angled face of the first swashplate.

3. The hydraulic piston motor of claim 2, wherein the second shoe cage is disposed adjacent to and engages the second angled face of the second swashplate.

4. The hydraulic piston motor of claim 1, wherein the shaft includes a first cylindrical end, a second cylindrical end, and a spherical center between the first cylindrical end and the second cylindrical end, wherein the first shoe cage and the second shoe cage are configured to engage the spherical center.

5. The hydraulic piston motor of claim 1, wherein the piston includes a first cylindrical end, a second cylindrical end, and a spherical center between the first cylindrical end and the second cylindrical end, wherein the first shoe cage and the second shoe cage engage the spherical center of the piston via the piston shoe.

6. The hydraulic piston motor of claim 1, wherein the piston shoe includes a first piston shoe and a second piston shoe.

7. The hydraulic piston motor of claim 1, further comprising a plurality of bolts to couple the first shoe cage to the second shoe cage.

8. The hydraulic piston motor of claim 1, wherein the first rotor includes a first center opening, the second rotor includes a second center opening, the first shoe cage includes a first shaft opening, and the second shoe cage includes a second shaft opening, wherein the shaft passes through the first center opening, the first shaft opening, the second shaft opening, and the second center opening.

9. The hydraulic piston motor of claim 1, further comprising:
   a first wear plate disposed on the first angled face and between the first angled face and the first shoe cage.

10. The hydraulic piston motor of claim 9, wherein the first swashplate includes a first material having a first weight and the first wear plate includes a second material having a second weight that is greater than the first weight.

11. An aircraft, comprising:
    a nose landing gear assembly including a hydraulic piston motor, the hydraulic piston motor including:
       a first rotor including a first cylinder;
       a second rotor opposing the first rotor, the second rotor including a second cylinder opposing the first cylinder;
       a first swashplate adjacent the first rotor, the first swashplate including a first angled face;
       a second swashplate adjacent the second rotor and opposing the first swashplate;
       a first shoe cage including a first piston opening, the first shoe cage disposed adjacent the first angled face of the first swashplate;
       a second shoe cage including a second piston opening, the second shoe cage adjacent the first shoe cage;
       a piston configured to travel into and out of the first cylinder and the second cylinder and to pass through the first piston opening and the second piston opening;
       a piston shoe configured to engage the piston, the first shoe cage, and the second shoe cage; and
       a shaft engaging the first shoe cage and the second shoe cage and configured to rotate in response to a rotation of the first shoe cage and the second shoe cage.

12. The aircraft of claim 11, wherein the second swashplate includes a second angled face that is parallel to the first angled face of the first swashplate.

13. The aircraft of claim 12, wherein the second shoe cage is disposed adjacent to and engages the second angled face of the second swashplate.

14. The aircraft of claim 11, wherein the shaft includes a first cylindrical end, a second cylindrical end, and a spherical center between the first cylindrical end and the second cylindrical end, wherein the first shoe cage and the second shoe cage are configured to engage the spherical center.

15. The aircraft of claim 11, wherein the piston includes a first cylindrical end, a second cylindrical end, and a spherical center between the first cylindrical end and the second cylindrical end, wherein the first shoe cage and the second shoe cage engage the piston via the spherical center.

16. The aircraft of claim 11, wherein the piston shoe includes a first piston shoe and a second piston shoe, the first piston shoe configured to engage the second shoe cage via the second piston shoe, and the second piston shoe configured to engage the first shoe cage via the first piston shoe.

17. The aircraft of claim 11, wherein the hydraulic piston motor further comprises a plurality of bolts to couple the first shoe cage to the second shoe cage.

18. The aircraft of claim 11, wherein the first rotor includes a first center opening, the second rotor includes a second center opening, the first shoe cage includes a first shaft opening, and the second shoe cage includes a second shaft opening, wherein the shaft passes through the first center opening, the first shaft opening, the second shaft opening, and the second center opening.

19. The aircraft of claim 11, wherein the hydraulic piston motor further comprises:
   a first wear plate disposed on the first angled face and between the first angled face and the first shoe cage.

20. The aircraft of claim 19, wherein the first swashplate includes a first material having a first weight and the first wear plate includes a second material having a second weight that is greater than the first weight.

* * * * *